CROSS REFERENCE EXAMINER
455/6
Jan. 10, 1961 R. V. ANDERSON 2,967,930
SELECTIVE CONVERSION NETWORK
Filed Nov. 13, 1959
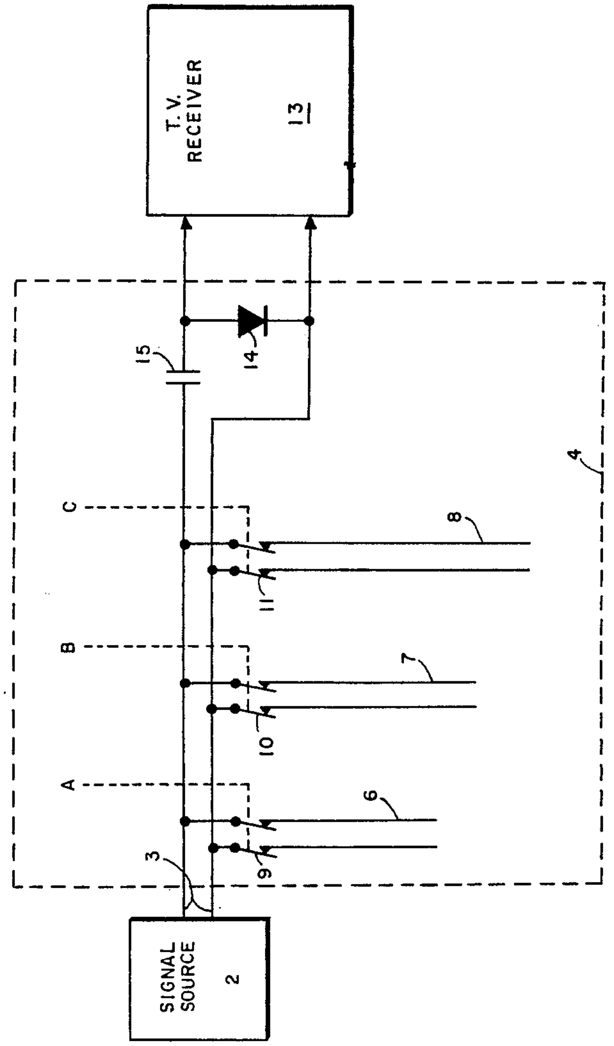
INVENTOR.
ROBERT V. ANDERSON
BY H. S. Mackey
ATTORNEY 2,967,930
Patented Jan. 10, 1961

2,967,930

SELECTIVE CONVERSION NETWORK

Robert V. Anderson, Mount Kisco, N.Y., assignor to General Precision, Inc., a corporation of Delaware Filed Nov. 13, 1959, Ser. No. 852,757
6 Claims. (Cl. 250—20)

This invention relates to conversion networks and more particularly to passive selective conversion networks which are suitable for converting any one preselected carrier frequency from a plurality of different carrier frequencies to a predetermined intermediate frequency.

The conversion network disclosed in this application is particularly suitable for use in a subscription television distribution system such as that disclosed by Warren D. Novak et al. in application Serial No. 852,826, filed November 13, 1959, wherein is shown a conversion network substantially similar to that disclosed herein.

The problem presented in such a distribution system was to selectively connect one of a plurality of information bearing carrier signals to an ordinary television receiver without requiring any alternations of the receiver and without the necessity of using active components in the connecting means. An obvious way of accomplishing this objective would be to distribute the carriers on the unused television channels and have a control unit for connecting the receiver input to a distribution cable through a plurality of selective filters each of which is designed to pass only one preselected carrier. With such a system the subscriber would have to tune his receiver to the proper channel and select the correct carrier on the control unit. Such a system is cumbersome and difficult to operate since it requires two selective choices. It was deemed preferable to have the receiver set at a single cable channel for all the programs distributed on the subscription cable and the program selection made at the control unit only.

One object of the invention is to provide a passive network for the manual selection of any one information bearing carrier signal from a plurality of information bearing carrier signals each having a different carrier frequency and for converting the selected carrier signal to a predetermined intermediate frequency.

Another object of the invention is to provide a passive network as set forth above which is both reliable in operation and inexpensive to manufacture.

The invention contemplates a selective conversion network for converting one preselected information bearing carrier signal from a plurality of information bearing carrier signals and associated conversion signals each having a different frequency, to a predetermined intermediate frequency comprising, means for short circuiting all of the conversion signals but the one associated with the preselected carrier, and means for mixing the carrier signals with the conversion signal associated with the preselected carrier signal to convert the preselected carrier signal to the predetermined intermediate frequency.

The foregoing and other objects and advantages of the invention will appear more clearly from a consideration of the specification and drawing wherein one embodiment of the invention is described and shown in detail for illustration purposes only.

The single figure is a schematic diagram of a novel selective conversion network constructed in accordance with the invention.

In the drawing a signal source 2 provides three modulated carrier signals, which will be referred to as A′, B′ and C′, and three conversion signals A″, B″ and C″ via a transmission line 3, which may be a two wire line or a coaxial cable, to the novel conversion network 4. In the specific embodiment chosen for illustration the information modulated carrier signals A′, B′ and C′ have frequencies of 50, 60 and 70 megacycles, respectively, and the conversion signals A″, B″ and C″ have frequencies of 135, 145 and 155 megacycles, respectively. Thus, when any conversion signal and its associated carrier are applied to a converter and mixed, the difference between the conversion signal frequency and its associated carrier frequency equals a constant for all of the information channels. In this instance, the constant equals 85 megacycles which was arbitrarily selected to coincide with channel six in the ordinary household television receiver.

Three open ended stubs 6, 7 and 8 are connected across transmission line 3 by double pole single throw switches 9, 10 and 11, respectively. Stub 6 is cut to equal in length one-quarter of the wavelength of conversion signal A″ and acts as a short circuit across transmission line 3 at the frequency of signal A″ when switch 9 is closed. Stub 7 is cut to equal in length one-quarter of the wavelength of conversion signal B″ and acts as a short circuit across transmission line 3 at the frequency of signal B″ when switch 10 is closed. Stub 8 is cut to equal in length one-quarter of the wavelength of conversion signal C″ and acts as a short circuit across transmission line 3 at the frequency of signal C″ when switch 11 is closed.

When the circuit is in the condition shown, that is when switches 9, 10 and 11 are closed, conversion signals A″, B″ and C″ are short circuited across transmission line 3. Mechanical linkages A, B and C are connected to switches 9, 10 and 11, respectively, to open or close the switches. Mechanical interlocks, not shown, may be provided to prevent the opening of more than one switch at any given time and provide for the closing of an open switch whenever another switch is opened. Such switching arrangements are numerous and well known in the art.

One side of transmission line 3 is connected to one terminal of the signal input of a television receiver 13 and to one side of a diode 14 by a coupling condenser 15 and the other side of line 3 is connected to the other terminal of the receiver input and the other side of diode 14.

To operate the device the receiver 13 must be turned on and tuned to 85 megacycles or channel 6 and one of the switches opened by operating one of the mechanical linkages. If linkage A is operated the receiver will reproduce the information carried by carrier A′ since carrier A′ will be mixed in diode 14 with conversion signal A″ to provide a signal containing the information on carrier A′ at 85 megacycles. The information on carriers B′ and C′ will not be received by the television receiver since neither will be at a frequency suitable for reception. When linkage B is operated, switches 9 and 11 are closed to short circuit conversion signals A″ and C″ and switch 10 is opened. Carrier B′ and conversion signal B″ are mixed in diode 14 to provide a signal containing the information on carrier B″ at 85 megacycles. This same analysis is true with regard to linkage C.

In the specific embodiment chosen for illustration certain frequencies were selected but these may be varied for different operating conditions. Furthermore, the novel conversion system was illustrated for use in a video system but it may be used in any system suitable for distribution of information in any form.

While only one embodiment of the invention has been shown and described in detail for illustration purposes it is to be expressly understood that the invention is not to be limited thereto.

What is claimed is:

1. A selective conversion network for converting any one preselected information bearing carrier signal from a plurality of information bearing carrier signals and associated conversion signals each having a different frequency to the same predetermined intermediate frequency comprising, means for short circuiting all of the conversion signals but the one associated with the one preselected carrier, and means for mixing all of the carrier signals with the said one conversion signal associated with the one preselected carrier to convert only the said one preselected carrier to the said predetermined intermediate frequency.

2. A selective conversion network as set forth in claim 1 where said means for short circuiting all but one of the conversion signals comprises a plurality of open ended transmission line stubs each cut to one-quarter of the wavelength of a different associated conversion signal, and means for selectively connecting all but one stub across the source supplying the signals.

3. A selective conversion network for converting any one preselected information bearing carrier signal from a plurality of information bearing carrier signals and associated conversion signals each having a different frequency to the same predetermined intermediate frequency comprising, means for passing the information bearing carrier signals and for passing only the conversion signal associated with the said one preselected carrier signal, and means for mixing all of the carrier signals with the passed conversion signal to convert only the preselected carrier signal to the said predetermined intermediate frequency.

4. A selective conversion network for converting any one preselected information bearing carrier signal from a plurality of information bearing carrier signals and associated conversion signals each having a different frequency to the same predetermined intermediate frequency comprising, means for passing the carrier frequencies and for suppressing all of the conversion signals but the conversion signal associated with the said one preselected information bearing carrier signal, and means for mixing the carrier signals with the nonsuppressed conversion signal to convert only the preselected carrier signal to the said predetermined intermediate frequency.

5. A selective conversion network for converting any one preselected information bearing carrier signal from a plurality of information bearing carrier signals and associated conversion signals each having a different frequency to the same predetermined intermediate frequency comprising, a transmission line for receiving the said information bearing carrier signals and their associated conversion signals, a plurality of open ended transmission line stubs each having a length substantially equal to one-quarter of the wavelength of a different conversion signal, means for selectively connecting all but one of said stubs across the transmission line, and means connected across said transmission line after said stubs for mixing the signal content of the line to convert only the preselected carrier signal to the said predetermined intermediate frequency.

6. A conversion network as set forth in claim 5 wherein said means for selectively connecting the stubs across the transmission line comprises a plurality of double pole switches each one of which connects one stub to the line.

References Cited in the file of this patent

UNITED STATES PATENTS 2,708,238 Silverman ____________ May 10, 1955

OTHER REFERENCES

Sandeman: "Transmission-Line Filters," Wireless Engineer, January 1949, pages 11 to 25.